(12) United States Patent
Azumi

(10) Patent No.: US 6,250,150 B1
(45) Date of Patent: Jun. 26, 2001

(54) SENSOR EMPLOYING HEATING ELEMENT WITH LOW DENSITY AT THE CENTER AND HIGH DENSITY AT THE END THEREOF

(75) Inventor: Junichi Azumi, Miyagi (JP)

(73) Assignees: Ricoh Company, Ltd., Tokyo; Ricoh Elemex Corporation, Nagoya, both of (JP)

( * ) Notice: Subject to any disclaimer, the term of this patent is extended or adjusted under 35 U.S.C. 154(b) by 0 days.

(21) Appl. No.: 09/176,025

(22) Filed: Oct. 21, 1998

(30) Foreign Application Priority Data

Oct. 22, 1997 (JP) .................................................. 9-289346

(51) Int. Cl.$^7$ ...................................................... G01F 1/68
(52) U.S. Cl. ...................................................... 73/204.26
(58) Field of Search ........................... 73/204.26, 204.5, 73/118.2, 204.15, 204.17

(56) References Cited

U.S. PATENT DOCUMENTS

| | | | |
|---|---|---|---|
| 4,936,145 | * 6/1990 | Hohenstatt | 73/204.26 |
| 5,195,367 | * 3/1993 | Hehenstatt et al. | 73/204.26 |
| 5,351,537 | * 10/1994 | Uramachi | 73/204.26 |
| 5,465,618 | * 11/1995 | Yasui et al. | 73/204.26 |
| 5,708,205 | * 1/1998 | Yamada et al. | 73/204.26 |
| 5,852,239 | 12/1998 | Sato et al. . | |

FOREIGN PATENT DOCUMENTS

| | | |
|---|---|---|
| 5-157758 | 6/1993 | (JP) . |
| 9-89619 | 4/1997 | (JP) . |

* cited by examiner

*Primary Examiner*—Harshad Patel
(74) *Attorney, Agent, or Firm*—Oblon, Spivak, McClelland, Maier & Neustadt, P.C.

(57) ABSTRACT

A substrate is put in flow of fluid, on which substrate a depression is formed. A film is disposed on an opening plane of the depression. A pair of heating elements, through each of which an electric current flows, are formed on the film at an upstream side and a downstream side of the flow of the fluid. A constant temperature-distribution arrangement is made in which the temperature distribution in each heating element when the electric current flows therethrough is constant along a longitudinal direction perpendicular to a direction in which the fluid flows.

10 Claims, 11 Drawing Sheets

SENSOR EMPLOYING HEATING ELEMENT WITH LOW DENSITY AT THE CENTER AND HIGH DENSITY AT THE END THEREOF

BACKGROUND OF THE INVENTION

1. Field of the Invention

The present invention relates to a sensor for measuring a flow velocity or a flow rate of fluid as a result of detecting change in resistance values of a plurality of heating elements disposed at an upstream side and a downstream side of flow of the fluid.

2. Description of the Related Art

As such a kind of sensor, a flow-velocity sensor or a flow-rate sensor has been known. Such a sensor is provided with a substrate having a depression therein and a film forming a bridge portion or a diaphragm portion which is disposed on an opening plane of the depression. The substrate is placed in flow of fluid. On the film, a pair of heating elements, through each of which an electric current flows, are disposed at an upstream side and at a downstream side of the flow of the fluid, respectively. In the case of a flow-velocity sensor, the resistances of the heating elements disposed at the upstream side and at the downstream side, respectively, are converted into voltages, respectively. As a result of obtaining the difference between changes in the thus-obtained voltages per unit time period, the flow velocity of the fluid is measured.

Such a sensor is disclosed in, for example, Japanese Laid-Open Patent Application No. 5-157758 'Temperature-Characteristics Correction Method for Flow-Velocity Sensor' and Japanese Laid-Open Patent Application No. 9-89619 'Thermal Flow Meter.'

An arrangement disclosed in Japanese Laid-Open Patent Application No. 5-157758 has, as shown in FIG. 1, a depression 52 formed at the center of a semiconductor substrate 51. A diaphragm portion 52a made of a film is formed on the substrate 51 so as to cover the opening plane of the depression 52. On the diaphragm portion 52a a heating element 53 and a pair of temperature-sensing resistance elements 54, 55, disposed at both sides of the heating element 53, are formed. The heating element 53 is heated as a result of an electric current flowing therethrough. Fluid flows in the direction of the arrow F shown in the figure. The temperature of the temperature-sensing resistance element 54 disposed at the upstream side decreases as a result of the temperature sensing resistance element 54 being cooled by the flowing fluid. The temperature of the temperature-sensing resistance element 55 disposed at the downstream side becomes higher than that of the upstream-side temperature-sensing resistance element 54 as a result of the temperature-sensing resistance element 55 being in contact with the fluid which is heated by the heating element 53. Then, the resistances values of the temperature-sensing resistance elements 54, 55, which resistance values correspond to the temperatures of the temperature-sensing resistance elements 54, 55, respectively, are converted into voltages. Then, as a result of obtaining the difference between changes in the thus-obtained voltages per unit time period, the flow velocity of the fluid is detected.

In an arrangement disclosed in Japanese Laid-Open Patent Application No. 9-89619, as shown in FIG. 2, a depression 57 is formed in a surface of a semiconductor substrate 56, bridge portions 58, 59 made of films are formed so as to cross the opening plane of the depression, and heating elements 60, 61 are formed on the bridge portions 58, 59, respectively. Then, the heating elements 60, 61 are heated as a result of electric currents flowing therethrough. Fluid flows in the direction of the arrow F shown in the figure. The temperature of the heating element 60 disposed at the upstream side decreases as a result of the heating element 60 being cooled by the fluid. The temperature of the heating element 61 disposed at the downstream side becomes higher than that of the upstream-side heating element 60 as a result of the downstream-side heating element 61 being in contact with the fluid heated by the upstream-side heating element 60. Then, the resistances values of the heating elements 60, 61, which resistance values correspond to the temperatures of the heating elements 60, 61, respectively, are converted into voltages. Then, as a result of obtaining the difference between changes in the thus-obtained voltages per unit time period, the flow rate of the fluid is detected.

The temperature-sensing resistance elements 54, 55 shown in FIG. 1 are formed so that the lengths thereof along the direction perpendicular to the direction in which the fluid flows are uniform, and the line width thereof is uniform. Also, the heating elements 60, 61 shown in FIG. 2 are formed so that the pattern density of each heating element is uniform along the direction perpendicular to the direction in which the fluid flows. The resistance values of the temperature-sensing resistance elements 54, 55 and the heating elements 60, 61 represent the temperatures thereof, respectively. Each of these temperature-sensing resistance elements 54, 55 and heating elements 60, 61 will be referred to as a heating element, hereinafter. In each of these heating elements, only a small amount of heat is carried away by the substrate at the central portion in the longitudinal direction perpendicular to the direction in which the fluid flows because the central portion is far away from the substrate. A large amount of heat is carried away by the substrate at each end portion in the above-mentioned longitudinal direction because each end portion is close to the substrate. As a result, as shown in FIG. 6B, where the horizontal axis represents the position on the heating element and the vertical axis represents the temperature of the heating element, the temperature distribution is such that the temperature is high at the central portion of the heating element and the temperature becomes lower at the position closer to each end. As a result, the average temperature of the whole heating element is low. As a result, especially, increasing of the temperature of the heating element disposed at the downstream side of the flow of the fluid is not performed efficiently. When a large electric current is caused to flow through the heating element for the purpose of improving the sensitivity of the sensor, the temperature at the central portion of the heating element is locally high. As a result, the life of the heating element becomes shorter, and, thereby, the life of the sensor becomes shorter.

SUMMARY OF THE INVENTION

An object of the present invention is to provide a sensor in which the life of the sensor can be elongated as a result of making the temperature distribution of the heating element be constant.

A sensor, according to the present invention, comprises:
- a substrate to be put in flow of fluid, on which substrate a depression is formed;
- a film disposed on an opening plane of the depression;
- a pair of heating elements, through each of which an electric current flows, formed on the film at an upstream side and a downstream side of the flow of the fluid; and a constant-temperature-distribution arrangement in which the temperature distribution in each heating element when the electric current flows therethrough is constant along a longitudinal direction perpendicular to a direction in which the fluid flows.

As a result of the temperature distribution in each heating element being constant, when a sufficient amount of electric current is caused to flow through the heating element for causing a desired amount of heat to be generated by the heating element, a situation in which the temperature of the central portion in the longitudinal direction of the heating element is locally high does not occur. As a result, the life of the heating element is elongated, and also it is possible to improve the sensitivity of the sensor.

The constant-temperature-distribution arrangement may be such that a pattern density of each of the pair of heating elements is low at a central portion in the longitudinal direction, and a pattern density of each of the pair of heating elements is high at each end portion in the longitudinal direction.

As a result, although the amount of heat carried away by the substrate is larger at each end portion of each heating element than that at the central portion thereof, the amount of heat generated at each end portion of each heating element is larger than that at the central portion thereof as a result of the pattern density being higher at each end portion thereof. Thereby, the temperature distribution of each heating element is constant.

The constant-temperature-distribution arrangement may be such that a line width of each of the pair of heating elements is large at a central portion in the longitudinal direction, and a line width of each of the pair of heating elements is small at each end portion in the longitudinal direction.

As a result, although the amount of heat carried away by the substrate is larger at each end portion of each heating element than that at the central portion thereof, the amount of heat generated at each end portion of each heating element is larger than that at the central portion thereof as a result of the line width being smaller, and, thus, the resistance being higher at each end portion thereof. Thereby, the temperature distribution of each heating element is constant.

The constant-temperature-distribution arrangement may be such that a pattern density of each of the pair of heating elements is low at a central portion in the longitudinal direction and a pattern density of each of the pair of heating elements is high at each end portion in the longitudinal direction, and, also, a line width of each of the pair of heating elements is large at a central portion in the longitudinal direction and a line width of each of the pair of heating elements is small at each end portion in the longitudinal direction.

As a result, although the amount of heat carried away by the substrate is larger at each end portion of each heating element than that at the central portion thereof, the amount of heat generated at each end portion of each heating element is larger than that at the central portion thereof as a result of both the pattern density being higher and the line width being smaller at each end portion thereof. Thereby, the temperature distribution of each heating element is constant. In this case, because there are two parameters, that is, the pattern density and the line width, to be adjusted in order to make the temperature distribution constant, it is possible to further make the temperature distribution of each heating element constant.

The constant-temperature-distribution arrangement may be such that each of the pair of heating elements comprises a first heating element having a predetermined length in the longitudinal direction, and a second heating element which is disposed in the vicinity of each end portion in the longitudinal direction of the first heating element.

As a result, although the amount of heat carried away by the substrate is larger at each end portion of each heating element than that at the central portion thereof, the total amount of heat generated at a position of each end portion of each heating element is larger than that at a position of the central portion thereof as a result of heat being also generated by the second heating element at the position of each end portion of each heating element. Thereby, the temperature distribution of each heating element is constant.

The first and second heating elements may be formed together with an insulating film inserted therebetween to have a three-layer structure.

As a result of superposition of the first and second heating elements with the insulating film inserted therebetween, it is possible to arrange the first and second heating elements in a small area.

The film has a thermally insulating portion formed at a position between each end portion in the longitudinal direction of each of the pair of heating elements and the substrate.

Thereby, although each end portion in the longitudinal direction of each of the pair of heating elements is close to the substrate, the amount of heat carried away by the substrate is controlled by the thermally insulating portion to a low amount. Thereby, the temperature distribution of each heating element is constant.

Other objects and further features of the present invention will become more apparent from the following detailed description when read in conjunction with the accompanying drawings.

BRIEF DESCRIPTIONS OF THE DRAWINGS

DETAILED DESCRIPTION OF THE PREFERRED EMBODIMENTS

Figure 1:
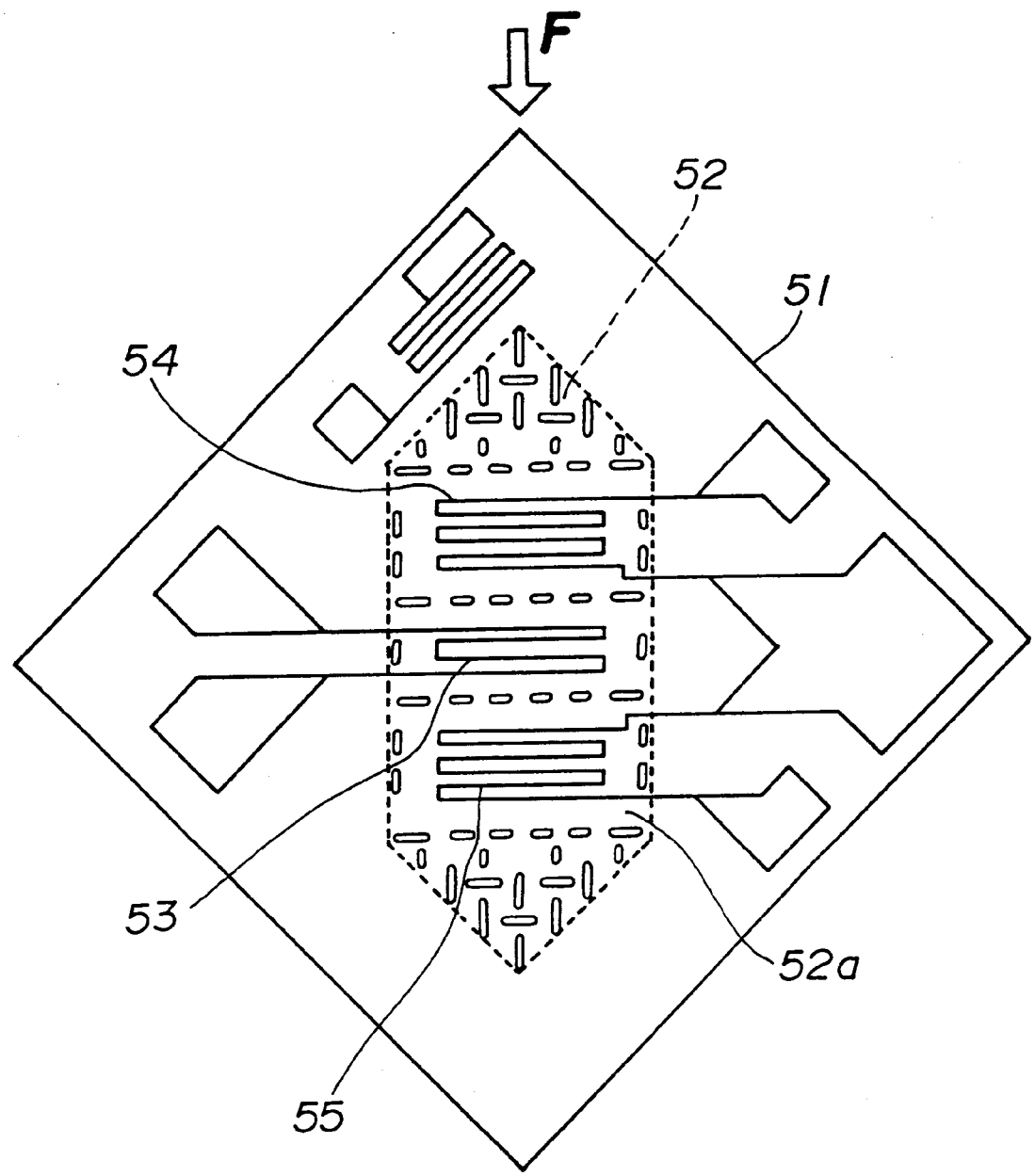
FIG. 1 shows a plan view of a flow-velocity sensor in the related art.
Figure 2:
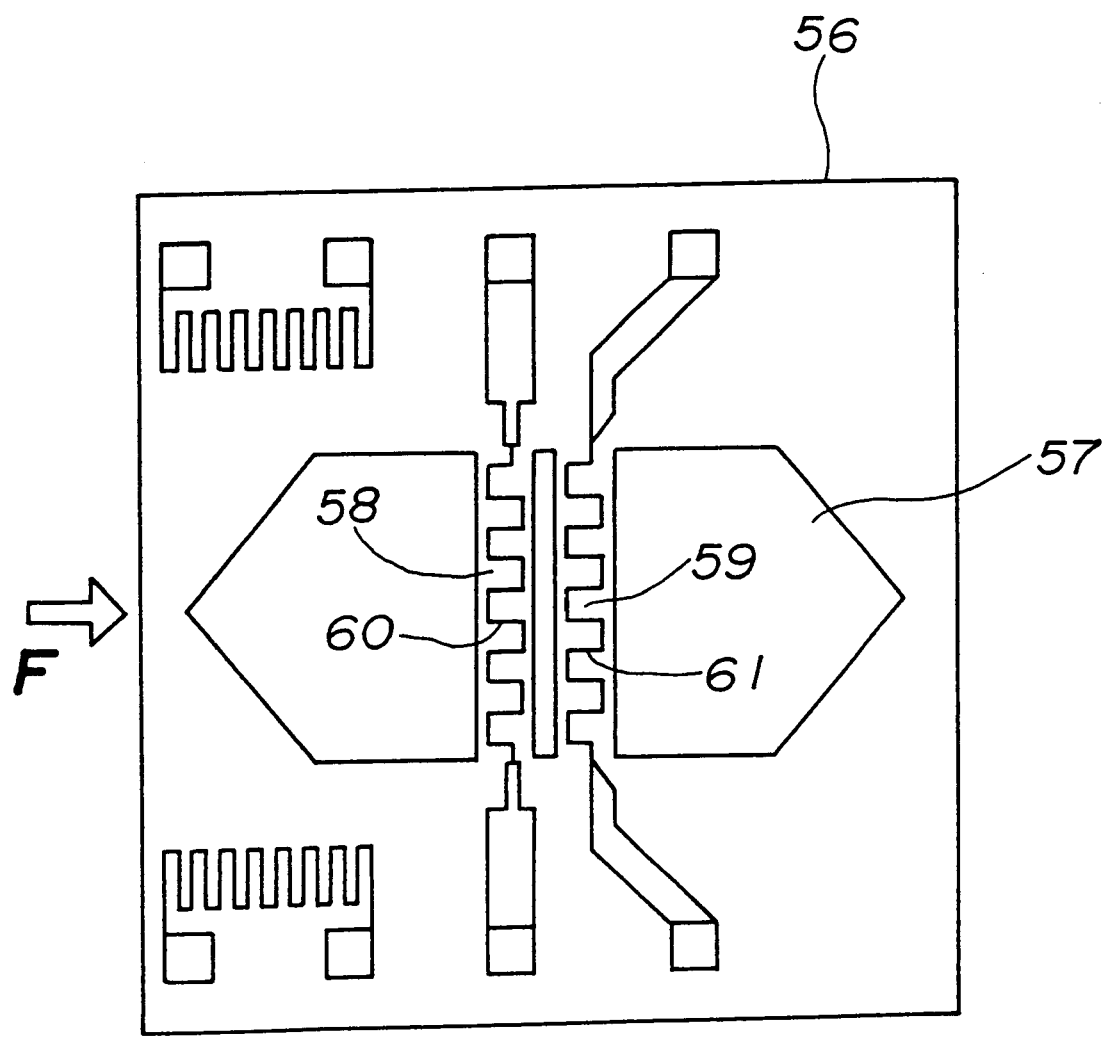
FIG. 2 shows a plan view of a thermal flow meter in the related art.
Figure 3:
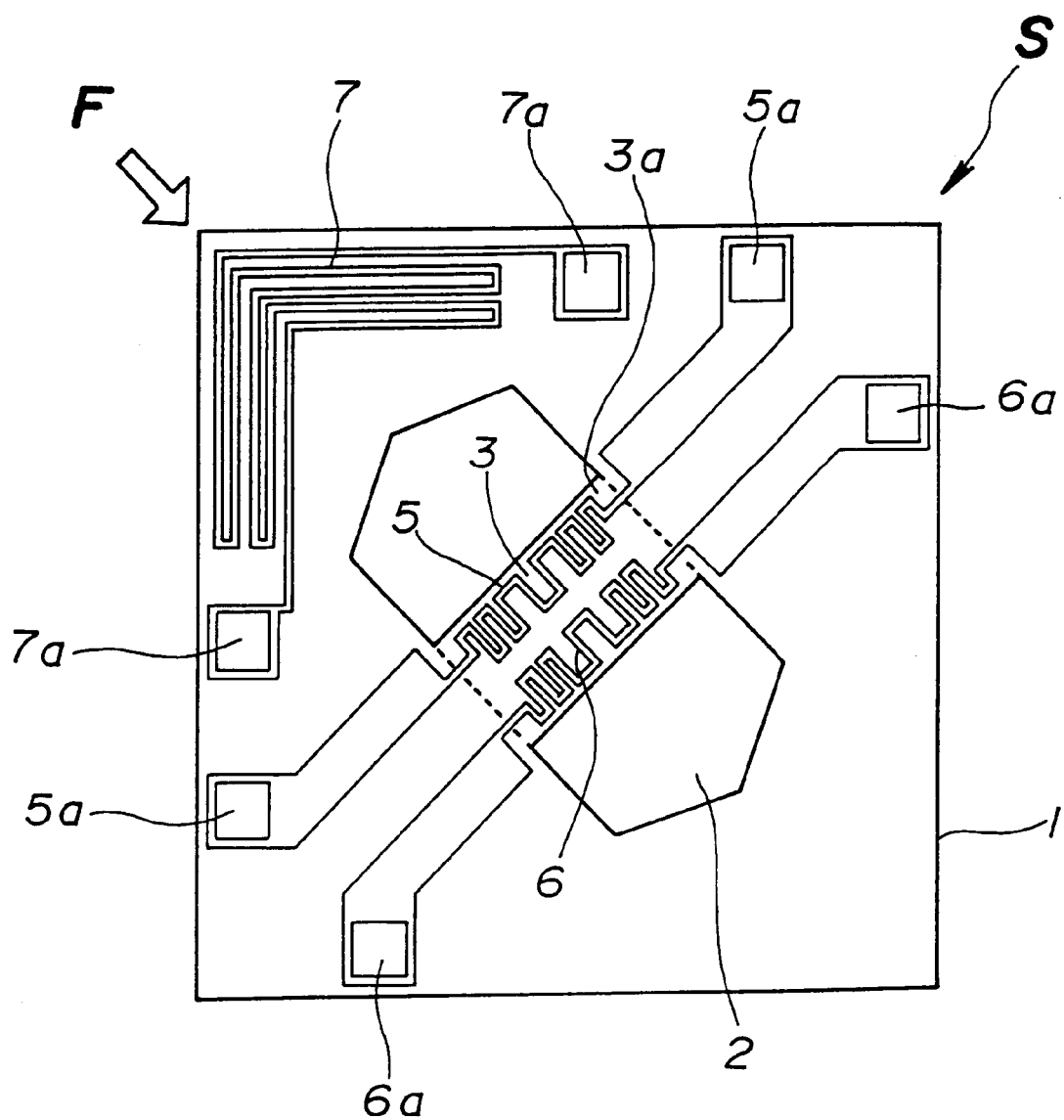
FIG. 3 shows a plan view of a flow-velocity sensor in a first embodiment of the present invention.
Figure 4:
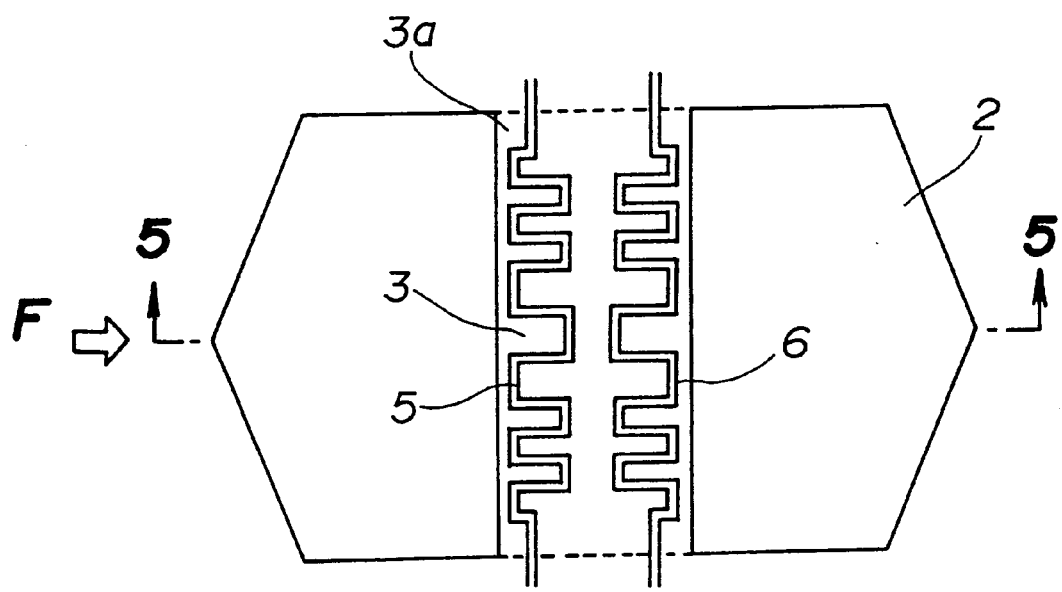
FIG. 4 shows a partial plan view of the flow-velocity sensor shown in FIG. 3 indicating an arrangement of heating elements.
Figure 5:
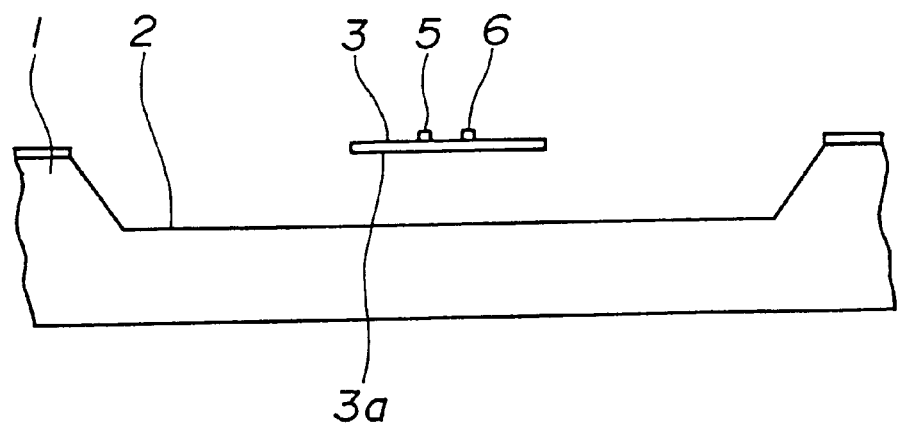
FIG. 5 shows a vertical section view taken along a line 5—5 in FIG. 4.

A first embodiment of the present invention will now be described with reference to FIGS. 3, 4 and 5. A sensor in the first embodiment is a flow-velocity sensor S which measures a flow velocity of fluid. The sensor includes a substrate 1 made of a semiconductor. The substrate 1 has a dent-shape depression 2 in the top surface thereof. A film 3 forming a bridge portion 3a is formed and is thermally insulated from the substrate 1 as a result of the presence of the depression 2. On the top of the film 3 at the position of the bridge portion 3a, heating elements 5, 6, each made of a thin film of platinum, are formed. Further, at a corner of the surface of the substrate 1, a fluid heating element 7 is formed via an insulating film (not shown in the figure). Both ends of each of the heating elements 5, 6 and 7 are connected to respective bonding pads 5a, 6a and 7a which are connected to external circuits (not shown in the figure).

The heating elements 5, 6 are disposed with a predetermined interval therebetween at the upstream side and the downstream side of the direction (the direction of the arrow F) in which fluid flows. This flow-velocity sensor S has a constant-temperature-distribution arrangement in which the temperature distribution in each of the heating elements 5, 6 along the longitudinal direction perpendicular to the direction of the flow of the fluid is constant. The constant-temperature-distribution arrangement in the first embodiment is such that the pattern density is low at the central portion of each of the heating elements 5, 6 in the above-mentioned longitudinal direction, and the pattern density is high at each end portion of each of the heating elements 5, 6 in the above-mentioned longitudinal direction. Specifically, each of the heating elements 5, 6 is formed to have a pattern of turning in a zigzag manner on the bridge portion 3a and the number of turns per unit length at each end portion is larger than that at the central portion.

When flow of fluid is measured, the substrate 1 is placed in the flow of the fluid in a manner in which the heating element 5 is located at the upstream side of the flow of the fluid and the heating element 6 is located at the downstream side of the flow of the fluid. When an electric current flows through each of the heating elements 5, 6, each of the heating elements 5, 6 generates heat. The temperature of the heating element 5 at the upstream side decreases as a result of the heating element 5 being cooled by the flowing fluid. The temperature of the heating element 6 at the downstream side becomes higher than that of the upstream-side heating element 5 as a result of the downstream-side heating element 6 being in contact with the fluid heated by the upstream-side heating element 5. The resistances of the heating elements 5, 6 located at the upstream side and at the downstream side, respectively, are converted into voltages, through a predetermined circuit, respectively. As a result of obtaining the difference between changes in the thus-obtained voltages per unit time period, the flow velocity of the fluid can be measured.

Figure 6A:
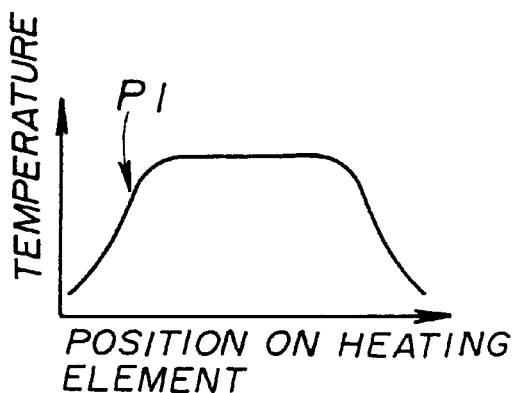
FIG. 6A is a graph showing a temperature distribution of each heating element in the first embodiment of the present invention.
Figure 6B:
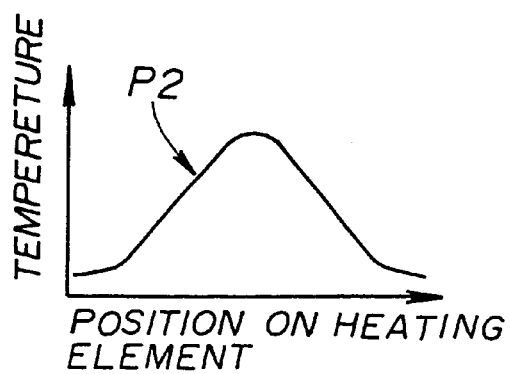
FIG. 6B is a graph showing a temperature distribution of each heating element in the related art.

In this case, the amount of heat carried away by the substrate 1 at each end portion of each of the heating elements 5, 6 is larger than the amount of heat carried away by the substrate 1 at the central portion thereof. However, because the pattern density of each of the heating elements 5, 6 at each end portion is higher than the pattern density thereof at the central portion, the amount of heat generated at each end portion of each of the heating elements 5, 6 is larger than the amount of heat generated at the central portion thereof. As a result, the temperature distribution is constant. As shown in FIG. 6A, where the horizontal axis represents the position on the heating element and the vertical axis represents the temperature of the heating element, the temperature distribution P1 is flat in comparison to the temperature distribution P2 shown in FIG. 6B in the case of the related art. Because the temperature distribution P2 in the case of the related art is not constant, it is necessary to increase the electric current flowing through each of the heating elements 5, 6 and thus increase the amount of heat to be generated thereby for the purpose of obtaining a desired sensitivity. As a result, the temperature at the central portion of each heating element is locally high, and the life of the heating elements is shortened. In contrast to this, in the above-described constant-temperature-distribution arrangement in the first embodiment, it is possible to make the temperature distribution in each heating element constant. As a result, there is no portion at which the temperature is locally high in each heating element. Thereby, it is possible to elongate the life of each heating element.

Figure 7:
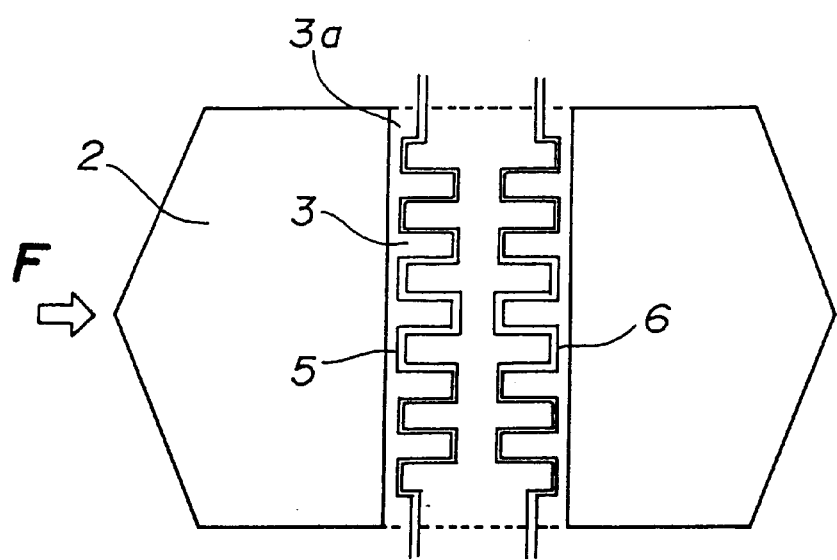
FIG. 7 shows a partial plan view of a second embodiment of the present invention indicating an arrangement of heating elements.

A second embodiment of the present invention will now be described with reference to FIG. 7. The arrangement of each of the second embodiment and other embodiments which will be described later, except for the constant-temperature-distribution arrangement, is the same as the arrangement of the first embodiment described above. Therefore, the same reference numerals are used for the corresponding portions, and the descriptions of these portions will be omitted. The constant-temperature-distribution arrangement in the second embodiment is such that the line width of each of the heating elements 5, 6 is large at the central portion in the longitudinal direction perpendicular to the direction in which fluid flows, and the line width of each of the heating elements 5, 6 is small at each end portion in the above-mentioned longitudinal direction, as shown in the figure.

As mentioned above, the amount of heat carried away by the substrate 1 at each end portion of each of the heating elements 5, 6 is larger than the amount of heat carried away by the substrate 1 at the central portion thereof. However, because the line width of each of the heating elements 5, 6 at each end portion is smaller than the line width thereof at the central portion, the resistance of each of the heating elements 5, 6 at each end portion is higher than the resistance thereof at the central portion, and the amount of heat generated at each end portion of each of the heating elements 5, 6 is larger than the amount of heat generated at the central portion thereof. As a result, the temperature distribution is constant. The advantage obtained from making the temperature distribution constant is the same as that in the case of the first embodiment.

Figure 8:
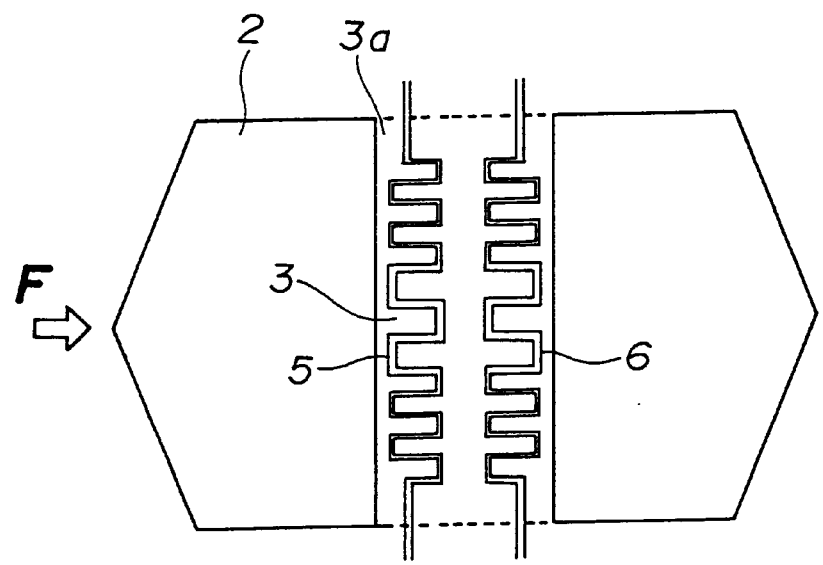
FIG. 8 shows a partial plan view of a third embodiment of the present invention indicating an arrangement of heating elements.

With reference to FIG. 8, a third embodiment of the present invention will now be described. As shown in the figure, in the constant-temperature-distribution arrangement in the third embodiment, the pattern density is low and the line width is large at the central portion in the longitudinal direction perpendicular to the direction in which fluid flows of each of the heating elements 5, 6, and the pattern density is high and the line width is small at each end portion in the above-mentioned longitudinal direction of each of the heating elements 5, 6.

As mentioned above, the amount of heat carried away by the substrate 1 at each end portion of each of the heating elements 5, 6 is larger than the amount of heat carried away by the substrate 1 at the central portion thereof. However, because the pattern density of each of the heating elements 5, 6 at each end portion is higher than the pattern density thereof at the central portion, and, also, the line width of each of the heating elements 5, 6 at each end portion is smaller than the line width thereof at the central portion, the amount of heat generated at each end portion of each of the heating elements 5, 6 is larger than the amount of heat generated at the central portion thereof. As a result, the temperature distribution is constant. In this case, because there are two parameters, that is, the pattern density and the line width, to be adjusted in order to make the temperature distribution constant, it is possible to further make the flat temperature distribution of each heating element constant. The advantage obtained from making the temperature distribution constant is the same as that in the case of the first embodiment.

Figure 9:
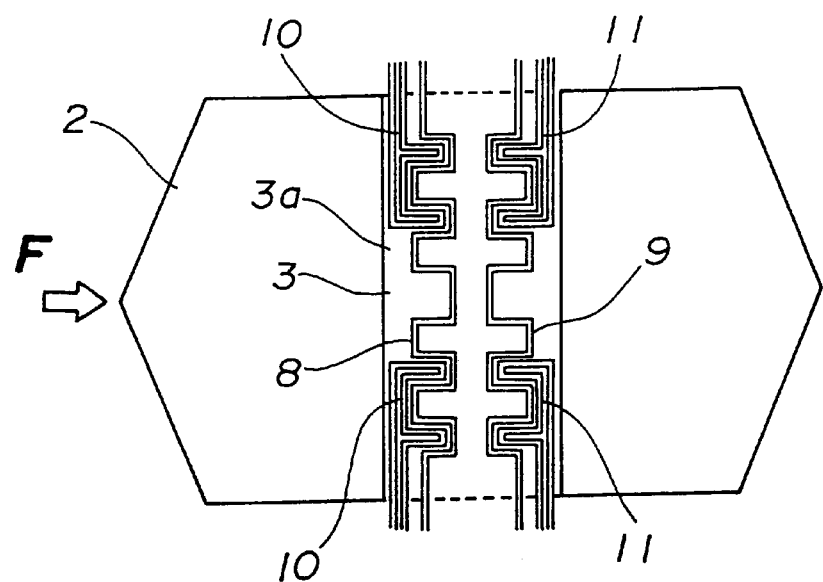
FIG. 9 shows a partial plan view of a fourth embodiment of the present invention indicating an arrangement of heating elements.

A fourth embodiment of the present invention will now be described with reference to FIG. 9. The constant-temperature-distribution arrangement in the fourth embodiment has first heating elements 8, 9, each made of a thin film of platinum and each having a predetermined length in the direction perpendicular to the direction in which fluid flows, and second heating elements 10, 11 which are disposed in the vicinity of both the end portions in the longitudinal direction of the first heating elements 8, 9. Each of the first heating elements 8, 9 is formed to have a zigzag pattern and have a uniform pattern density and a uniform line width along the longitudinal direction of the bridge portion 3a. The second heating elements 10, 11 are disposed separately at both the end portions of the bridge portion 3a, as shown in the figure.

The amount of heat carried away by the substrate 1 at each end portion of each of the first heating elements 8, 9 (each end portion of the bridge portion 3a) is larger than the amount of heat carried away by the substrate 1 at the central portion thereof. However, the amount of heat generated at each end portion of the bridge portion 3a becomes larger than the amount of heat generated at the central portion thereof because the second heating elements 10, 11 generate heat at each end portion of the bridge portion 3a. Thus, the temperature distribution of the bridge portion 3a can be constant, and thereby, the temperature distribution of each of the first heating elements 8, 9 is constant.

Figure 10:
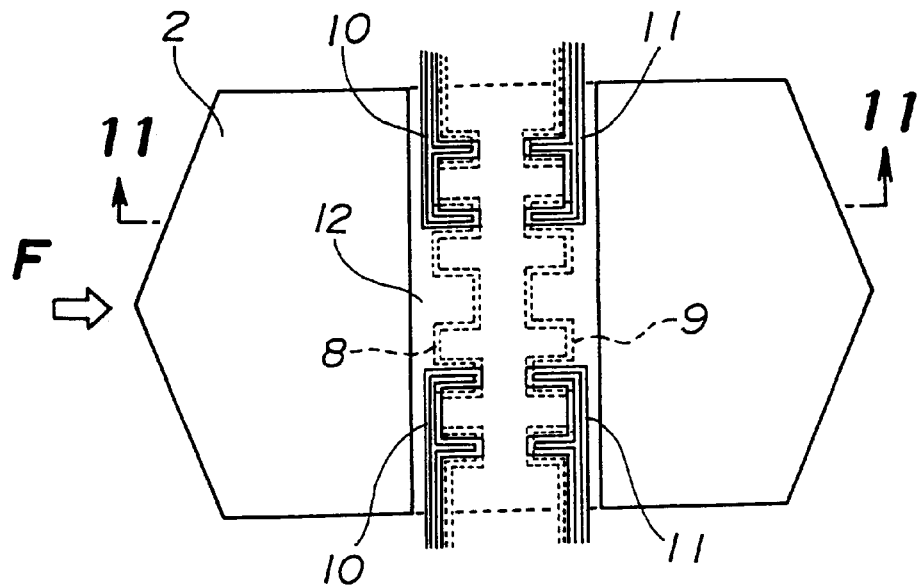
FIG. 10 shows a partial plan view of a fifth embodiment of the present invention indicating an arrangement of heating elements.
Figure 11:
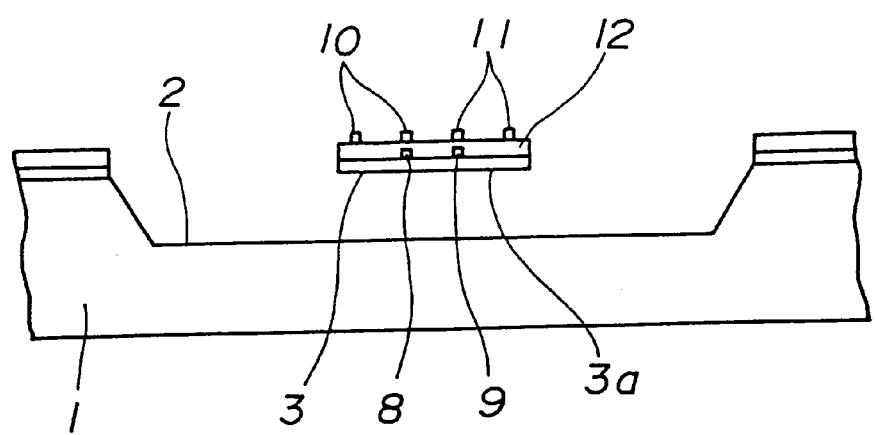
FIG. 11 shows a vertical section view taken along a line 11—11 in FIG. 10.

With reference to FIGS. 10 and 11, a fifth embodiment of the present invention will now be described. The constant-temperature-distribution arrangement in the fifth embodiment is such that the first heating elements 8, 9 and the second heating elements 10, 11 in the fourth embodiment are formed on the bridge portion 3a with an insulating film 12 inserted therebetween so as to form a three-layer structure.

As a result, the advantage similar to that in the fourth embodiment can be obtained. Further, as a result of superposition of the first heating elements 8, 9 and the second heating elements 10, 11 with the insulating layer 12 inserted therebetween being enabled, it is possible to arrange the first and second heating elements 8, 9, 10, 11 in a small area.

Figure 12:
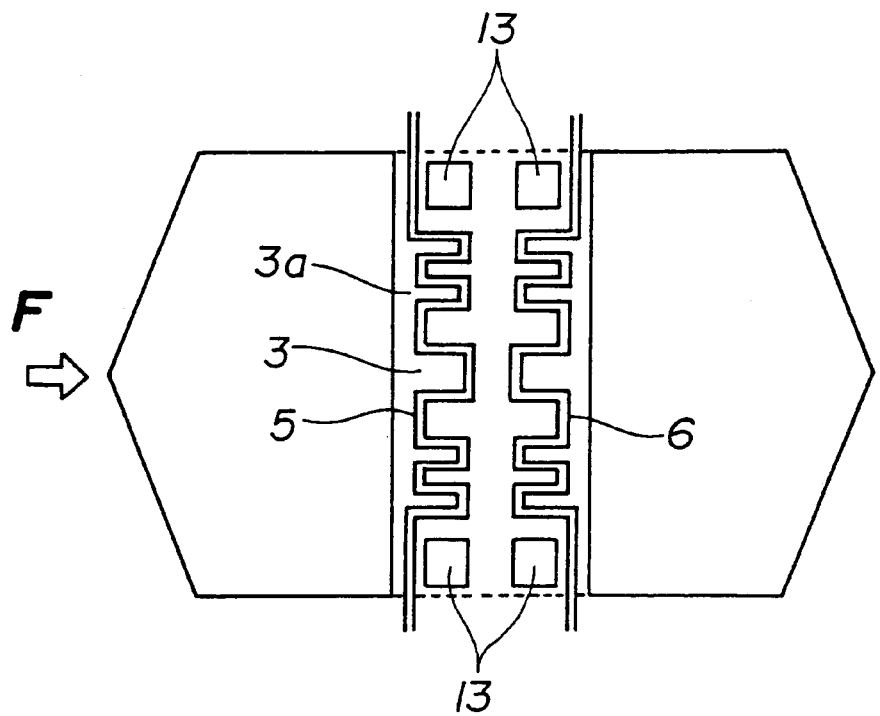
FIG. 12 shows a partial plan view of a sixth embodiment of the present invention indicating an arrangement of heating elements and openings acting as thermally insulating portions.
Figure 13:
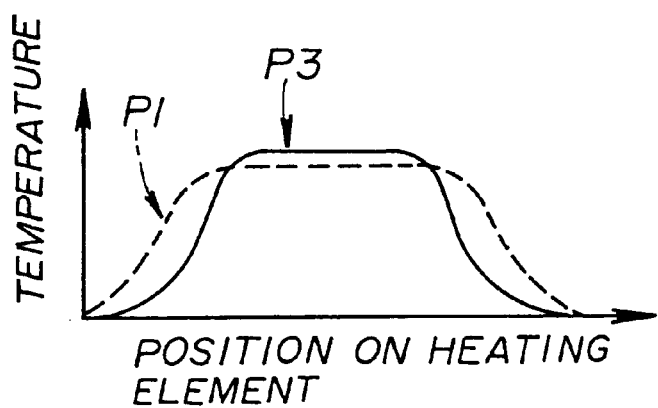
FIG. 13 is a graph showing a temperature distribution of each heating element in the sixth embodiment.

With reference to FIGS. 12 and 13, a sixth embodiment of the present invention will now be described. The constant-temperature-distribution arrangement in the sixth embodiment is such that an opening 13, acting as a thermally insulating portion, is formed in the film 3 between each end portion, in the longitudinal direction perpendicular to the direction in which fluid flows, of each of the heating elements 5, 6, and the substrate 1. A total of four openings 13 are used, wherein two openings 13 are formed at each of the end portions of the bridge portion 3a, as shown in FIG. 12.

The film 3 is formed above the depression 2 so that the heating elements 5, 6 are thermally insulated from the substrate 1. However, the film 3 also has heat conductivity although the heat conductivity of the film 3 is smaller than that of the substrate 1. As a result of forming the openings 13 near the substrate 1 (near both ends of the bridge portion 3a), it is possible to control the amount of heat carried away by the substrate 1 through each end portion in the longitudinal direction of each of the heating elements 5, 6. As a result, as shown in FIG. 13, the temperature distribution of each of the heating elements 5, 6 is constant, and the flat temperature distribution P3 is obtained. Further, because heat is not likely to be transferred to the substrate 1 as a result of the presence of the openings 13, it is possible to efficiently increase the temperature of each of the heating elements 5, 6 in comparison to the case of the temperature distribution P1 shown in FIG. 6A. As a result, it is possible to increase the sensitivity of the sensor.

In the sixth embodiment, the constant-temperature-distribution arrangement, described with reference to FIGS. 3, 4 and 5 in which the pattern density of each of the heating elements 5, 6 is higher at each end portion than that of the central portion, is also applied, as shown in FIG. 12. However, it is also possible that, in the sixth embodiment, any of the constant-temperature-distribution arrangements described with reference to FIGS. 7, 8, 9, 10 and 11 is also applied, instead of also applying the constant-temperature-distribution arrangement described with reference to FIGS. 3, 4 and 5.

Figure 14:
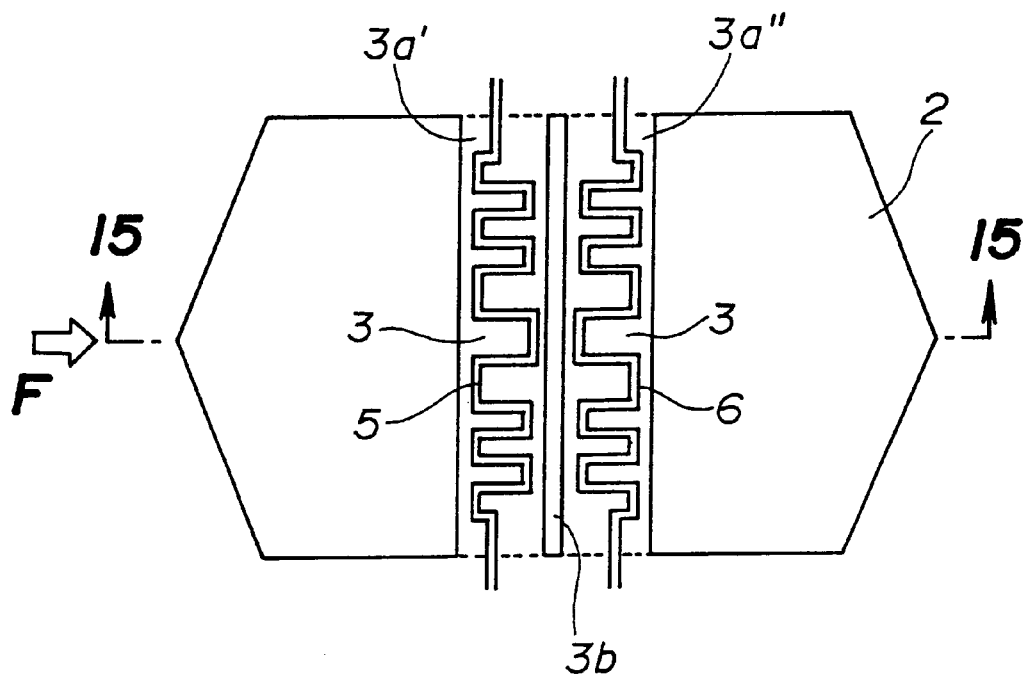
FIG. 14 shows a partial plan view of a variant embodiment of the first embodiment.
Figure 15:
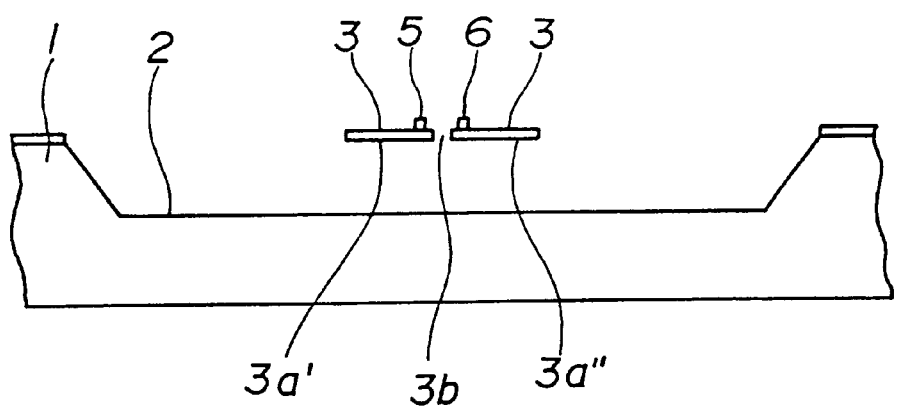
FIG. 15 shows a vertical section view taken along a line 15—15 in FIG. 14.

Further, as show in FIGS. 14 and 15, it is possible to form a slit 3b in the bridge portion 3a so that the bridge portion 3a is separated into a bridge portion 3a' and a bridge portion 3a". The heating element 5 is formed on the bridge portion 3a' and the heating element 6 is formed on the bridge portion 3a". In this embodiment shown in FIGS. 14 and 15, the slit 3b is formed in the bridge portion 3 in the embodiment shown in FIGS. 4 and 5. However, it is also possible to form the slit 3b in the bridge portion 3 in any of the embodiments shown in FIGS. 7, 8, 9, 10, 11 and 12.

Figure 16:
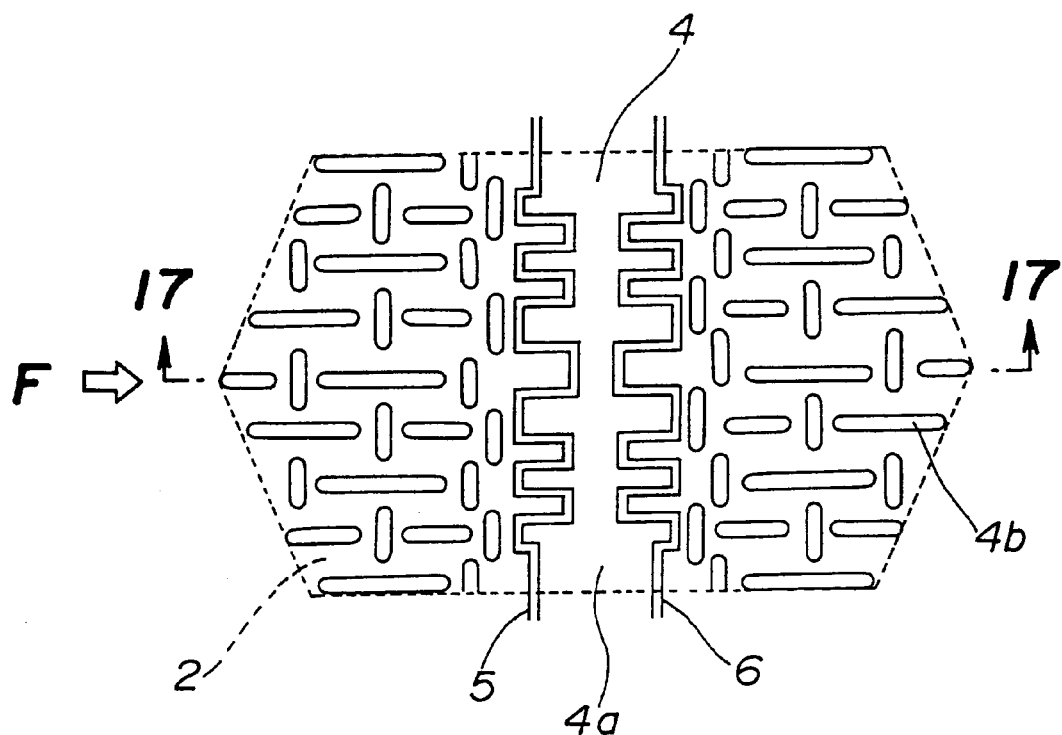
FIG. 16 shows a partial plan view of another variant embodiment of the first embodiment.
Figure 17:
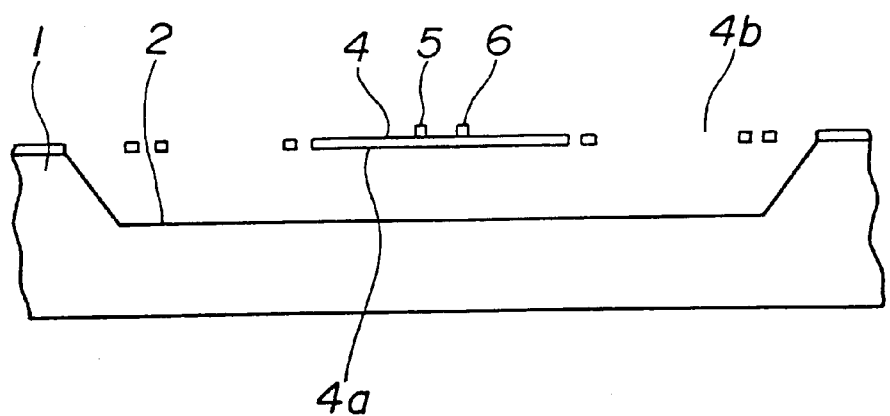
FIG. 17 shows a vertical section view taken along a line 17—17 in FIG. 16.

Further, the constant-temperature-distribution arrangement in any of the above-described embodiments can also be applied to a sensor which has a diaphragm portion. FIGS. 16 and 17 show an embodiment having a diaphragm portion 4a which is formed by a film 4 covering the depression 2. In the diaphragm portion 4a, as shown in the figures, many openings 4b are formed. In the embodiment shown in FIGS. 16 and 17, the constant-temperature-distribution arrangement shown in FIGS. 4 and 5 is applied to the sensor having the diaphragm portion 4a. However, it is also possible to apply any of the constant-temperature-distribution arrangements shown in FIGS. 7, 8, 9, 10, 11 and 12 to the sensor having the diaphragm portion 4a.

Figure 18:
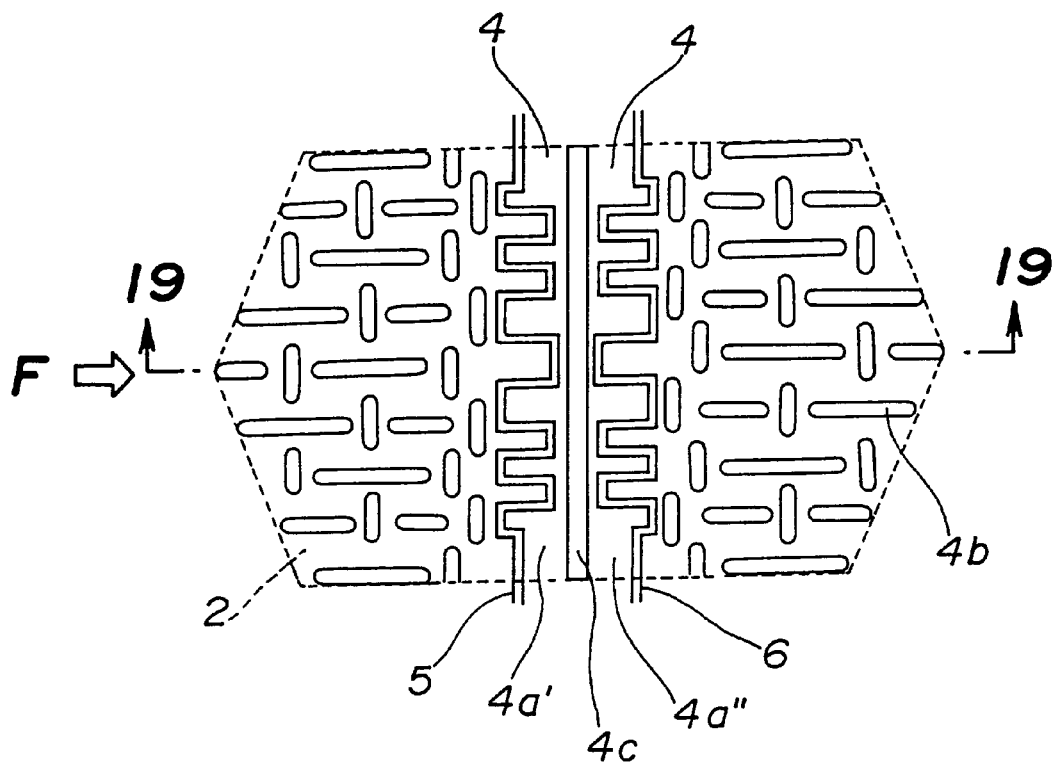
FIG. 18 shows a partial plan view of another variant embodiment of the first embodiment.
Figure 19:
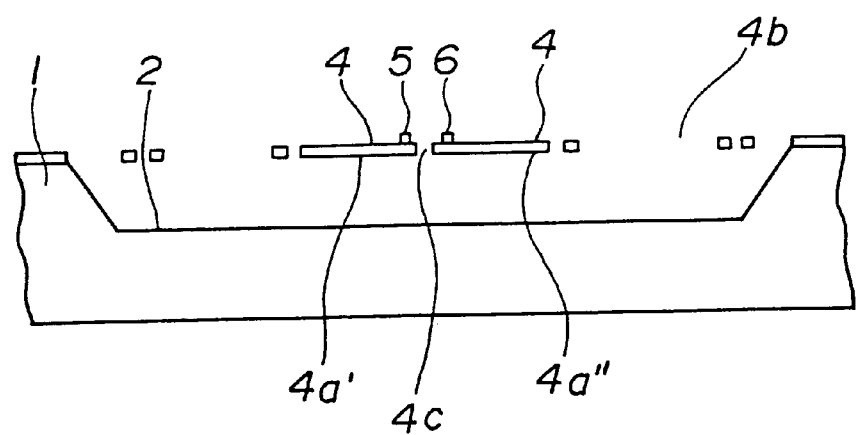
FIG. 19 shows a vertical section view taken along a line 19—19 in FIG. 18.

It is also possible that, as shown in FIGS. 18 and 19, in the embodiment shown in FIGS. 16 and 17, in which the diaphragm portion 4a is formed, a slit 4c is formed in the diaphragm portion 4a between the positions at which the heating elements 5 and 6 are formed, respectively. Thereby, the diaphragm portion 4a is separated into diaphragm portions 4a' and 4a" on which the heating elements 5 and 6 are formed, respectively. Further, it is also possible to apply such an arrangement (in which the diaphragm portion 4a is formed and the slit 4c is formed in the diaphragm portion 4a between the upstream-side and downstream-side heating elements) to any of the embodiments shown in FIGS. 7, 8, 9, 10, 11 and 12.

Further, the heating elements 5, 6, 8, and 9 heat the heating elements themselves and heat fluid, respectively, and, also, are used for detecting the velocity of flow of the fluid as a result of the resistance thereof being measured in the form of the voltages, in the above-described embodiments. However, it is also possible to provide another special heating element, in each embodiment, which heats fluid but is not directly used for detecting the velocity of flow of the fluid. In this case, the heating elements 5, 6 or 8, 9 are directly used for detecting the velocity of flow of the fluid.

Further, the present invention is not limited to the above-described embodiments, and variations and modifications may be made without departing from the scope of the present invention.

The contents of the basic Japanese Patent Application No. 9-289346, filed on Oct. 22, 1997, are hereby incorporated by reference.

What is claimed is:

1. A sensor comprising:
   a substrate to be put in flow of fluid, on which substrate a depression extending in a first direction is formed;
   a film disposed on an opening plane of said depression;
   a pair of heating elements, through each of which an electric current flows, formed spaced apart on said film in a second direction traversing said first direction; and
   said pair of heating elements configured to have a constant-temperature-distribution arrangement in which the temperature distribution in each heating element when the electric current flows therethrough is constant along said second direction,
   wherein said constant-temperature-distribution arrangement is such that a pattern density of each of said pair of heating elements is low at a central portion in the second direction, and a pattern density of each of said pair of heating elements is high at each end portion in the second direction.

2. The sensor as claimed in claim 1, wherein said constant-temperature distribution arrangement is such that a line width of each of said pair of heating elements is large at a central portion in the second direction, and a line width of each of said pair of heating elements is small at each end portion in the second direction.

3. The sensor as claimed in claim 2, wherein said constant-temperature-distribution arrangement is such that the film has a thermally insulating portion at a position between each end portion in the second direction of each of said pair of heating elements and the substrate.

4. The sensor as claimed in claim 1, wherein said constant-temperature-distribution arrangement is such that a pattern density of each of said pair of heating elements is low at a central portion in the second direction and a pattern density of each of said pair of heating elements is high at each end portion in the second direction, and also, a line width of each of said pair of heating elements is large at a central portion in the second direction and a line width of each of said pair of heating elements is small at a each end portion in the second direction.

5. The sensor as claimed in claim 4, wherein said constant-temperature-distribution arrangement is such that the film has a thermally insulating portion at a position between each end portion in the second direction of each of said pair-of heating elements and the substrate.

6. The sensor as claimed in claim 1, wherein said constant-temperature-distribution arrangement is such that each of said pair of heating elements comprises a first heating element having a predetermined length in the second direction, and a second heating element which is disposed in the vicinity of end portion in the second direction of said first heat element.

7. The sensor as claimed in claim 6, wherein said first and second heating elements are formed together with an insulating film inserted therebetween to have a three-layer structure.

8. The sensor as claimed in claim 7, wherein said constant-temperature-distribution arrangement is such that the film has a thermally insulating portion at a position between each end portion in the second direction of each of said pair of heating elements and the substrate.

9. The sensor as claimed in claim 6, wherein said constant-temperature-distribution arrangement is such that the film has a thermally insulating portion at a position between each end portion in the second direction of each of said pair of heating elements and the substrate.

10. The sensor as claimed in claim 1, wherein said constant-temperature-distribution arrangement is such that the film has a thermally insulating portion at a position between each end portion in the second direction of each of said pair of heating elements and the substrate.

* * * * *